United States Patent
Katayama

(10) Patent No.: US 8,860,558 B2
(45) Date of Patent: Oct. 14, 2014

(54) REMOTE CONTROL DEVICE AND COMMUNICATION SYSTEM

(75) Inventor: Tsuyoshi Katayama, Kyoto (JP)

(73) Assignee: Panasonic Corporation, Osaka (JP)

( * ) Notice: Subject to any disclaimer, the term of this patent is extended or adjusted under 35 U.S.C. 154(b) by 163 days.

(21) Appl. No.: 13/414,488

(22) Filed: Mar. 7, 2012

(65) Prior Publication Data
US 2012/0169483 A1   Jul. 5, 2012

Related U.S. Application Data

(63) Continuation of application No. PCT/JP2010/005069, filed on Aug. 16, 2010.

(30) Foreign Application Priority Data

Sep. 11, 2009  (JP) .................................. 2009-210934

(51) Int. Cl.
*G05B 11/01* (2006.01)

(52) U.S. Cl.
USPC ................. 340/12.22; 340/426.14; 340/636.1; 340/636.17; 429/162; 320/132; 712/225

(58) Field of Classification Search
CPC ............ A61M 5/172; A61M 5/16854; A61M 5/14276; A61M 2005/14204; A61M 5/14248; G06F 19/3418; H04W 36/14; H04W 88/06; B60R 16/027; B60R 25/04; B60R 25/24; B60R 25/1003; G08C 17/02; G08C 2201/31; G08C 19/28; G08C 23/04; G07C 9/00182; G07C 2009/00793; Y02E 60/12; H01M 10/48; G01R 31/3648; G01R 15/04; G01R 19/16542; G01R 31/3658; G08B 29/181; H02J 7/0047; B60L 3/0023; B60L 3/0069

USPC .................. 340/12.54, 12.22, 426.14, 636.1, 340/636.17; 429/162; 320/132; 712/225
See application file for complete search history.

(56) References Cited

U.S. PATENT DOCUMENTS 5,594,427 A * 1/1997 Kim et al. .................. 340/12.22
7,847,646 B2 * 12/2010 Tsai et al. ....................... 331/77
(Continued)

FOREIGN PATENT DOCUMENTS

CN        1603155 A     4/2005
JP       08-023580      1/1996
(Continued)

OTHER PUBLICATIONS

Questions and Answers from http://detail.chiebukuro.yahoo.co.jp/qa/question_detail/q1313380333 and a partial English Translation thereof.

(Continued)

*Primary Examiner* — Omer S Khan
(74) *Attorney, Agent, or Firm* — McDermott Will & Emery LLP

(57) ABSTRACT

A remote control device includes: a vibration power generator configured to convert externally applied vibrations to electric power; a storage section charged with the electric power obtained by the vibration power generator; a switch provided between the vibration power generator and the storage section; and a control circuit configured to output a vibration instruction signal and turn the switch on when the remaining power of the storage section becomes smaller than a predetermined amount. The electronic apparatus instructs the user to vibrate the remote control device in response to the vibration instruction signal.

16 Claims, 13 Drawing Sheets

(56) References Cited

U.S. PATENT DOCUMENTS

| | | | |
|---|---|---|---|
| 2004/0100870 A1* | 5/2004 | Igarashi et al. | 368/66 |
| 2005/0166651 A1* | 8/2005 | Stoschek et al. | 70/264 |
| 2006/0049801 A1* | 3/2006 | Miyazaki | 320/132 |
| 2007/0040655 A1* | 2/2007 | Lee et al. | 340/10.1 |
| 2008/0054851 A1 | 3/2008 | Nozawa | |
| 2008/0252432 A1* | 10/2008 | Hein et al. | 340/426.14 |
| 2009/0027167 A1* | 1/2009 | Pistor et al. | 340/10.1 |
| 2009/0094442 A1* | 4/2009 | Okamoto et al. | 712/225 |

FOREIGN PATENT DOCUMENTS

| | | |
|---|---|---|
| JP | 8-23580 A | 1/1996 |
| JP | 08-289374 | 11/1996 |
| JP | 8-289374 A | 11/1996 |
| JP | 2008-199787 | 8/2008 |
| JP | 2008-199787 A | 8/2008 |
| JP | 2008199787 A | 8/2008 |

OTHER PUBLICATIONS

International Search Report issued in International Patent Application No. PCT/JP2010/005069, mailed Nov. 2, 2010.

Search Report issued in Chinese Application No. 201080039359 dated Dec. 4, 2013.

* cited by examiner

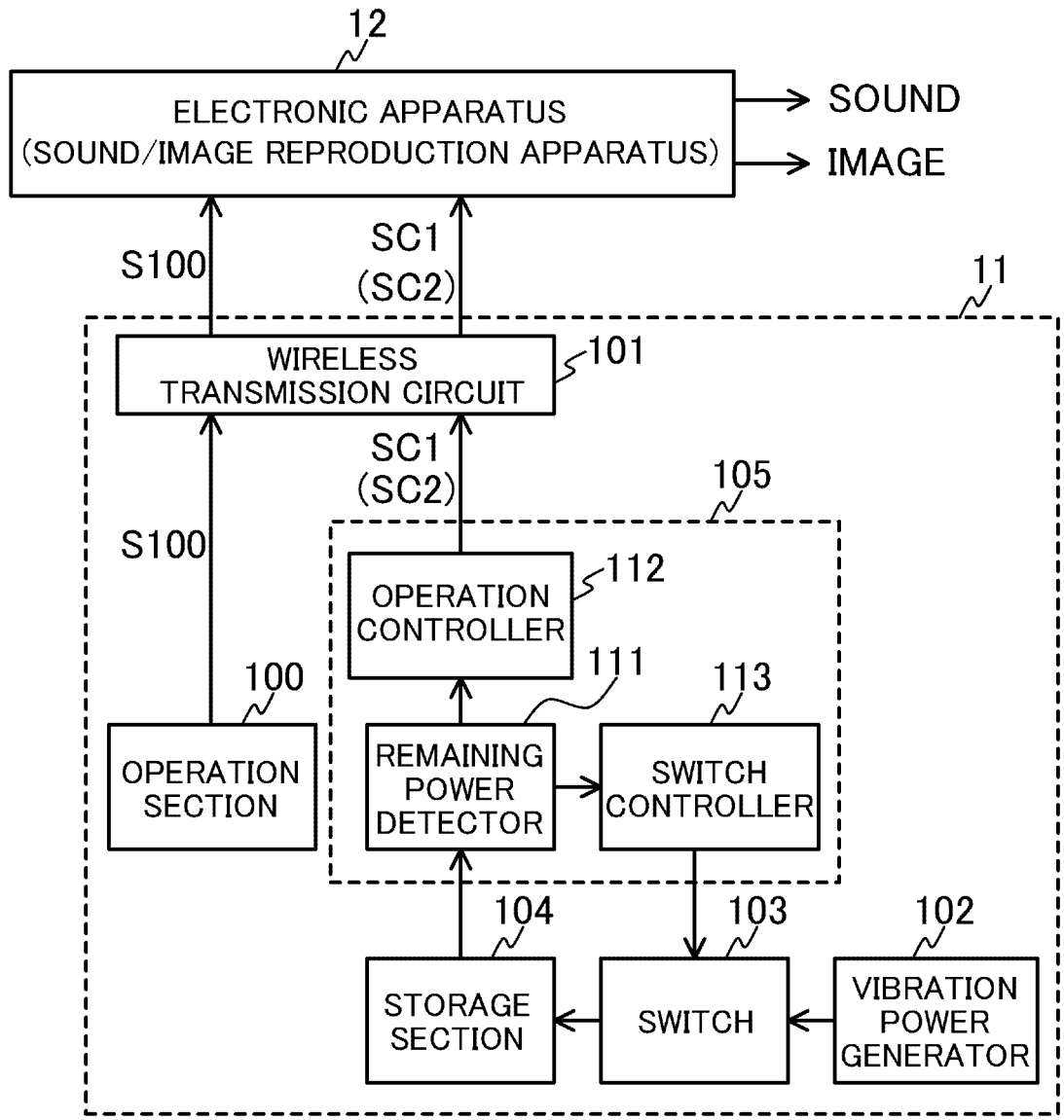

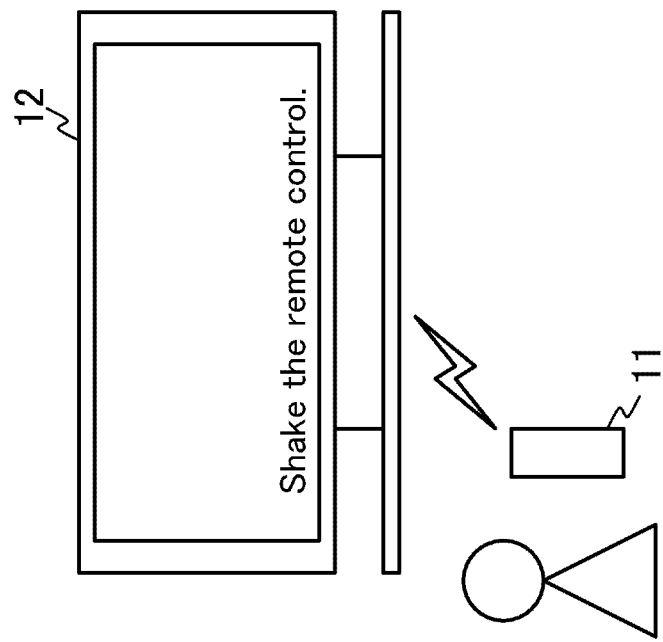
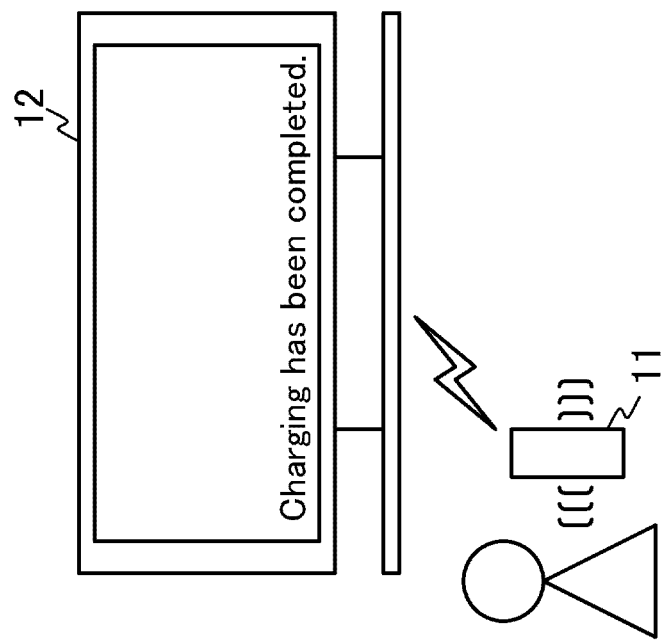

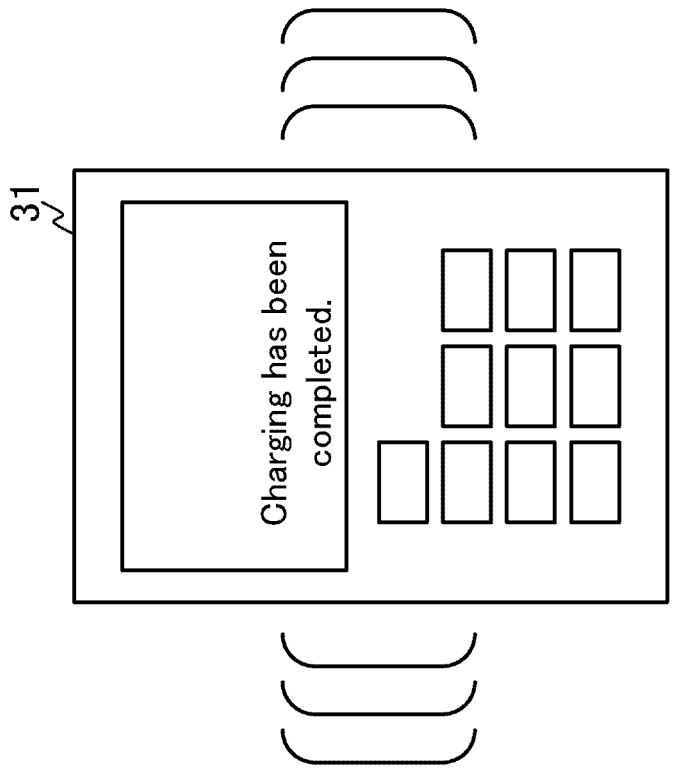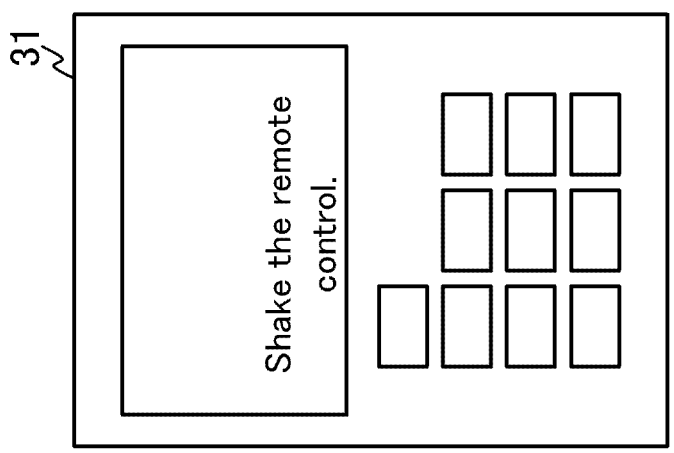

REMOTE CONTROL DEVICE AND COMMUNICATION SYSTEM

CROSS-REFERENCE TO RELATED APPLICATION

This is a continuation of PCT International Application PCT/JP2010/005069 filed on Aug. 16, 2010, which claims priority to Japanese Patent Application No. 2009-210934 filed on Sep. 11, 2009. The disclosures of these applications including the specifications, the drawings, and the claims are hereby incorporated by reference in their entirety.

BACKGROUND

The present disclosure relates to a remote control device that remotely controls an electronic apparatus and a communication system, and more particularly to management of the remaining power of a remote control device.

Conventionally, a remote control device remotely controls an electronic apparatus by transmitting an operation signal to the electronic apparatus in response to user operation (operation given by the user). When the remaining power of such a remote control device becomes insufficient, the remote control device may not be able to transmit an operation signal. It is therefore important to manage the remaining power of the remote control device. In general, a remote control device is provided with a battery as the power source. When the battery becomes weak, the battery is replaced (or charged) to solve the power shortage.

Japanese Patent Publication No. 2008-199787 (Patent Document 1) discloses a remote control device requiring no battery replacement. This remote control device includes a coil, a metal body capable of reciprocating inside a coil-wound portion, and a storage section (capacitor). The capacitor successively stores a current generated in the coil by electromagnetic induction occurring when the metal body reciprocates inside the coil-wound portion. The electric power stored in the capacitor is supplied to an electronic circuit in the remote control device as drive power.

SUMMARY

The remote control device disclosed in Patent Document 1 has no means to notify the user of its power shortage, thereby preventing the user from determining whether the remote control device can be used without charging. For example, when carrying the remote control device for only a short time, the user cannot determine immediately whether sufficient power has been stored in the remote control device. Also, the user, who is not notified of power shortage of the remote control device, finds difficulty in determining, when the remote control device becomes unusable, whether this is due to power shortage of the remote control device or a breakdown thereof.

It is an objective of the present disclosure to provide a technique that permits the user to be notified of power shortage of a remote control device and also instructed to perform an operation for charging the remote control device.

According to one aspect of the present disclosure, the communication system includes: a remote control device; and an electronic apparatus, wherein the remote control device includes a vibration power generator configured to convert externally applied vibrations to electric power, a storage section charged with the electric power obtained by the vibration power generator, a switch provided between the vibration power generator and the storage section, and a control circuit configured to output a vibration instruction signal and turn the switch on when the remaining power of the storage section becomes smaller than a predetermined amount, and the electronic apparatus instructs the user to vibrate the remote control device in response to the vibration instruction signal. In this communication system, it is possible to notify the user of power shortage of the remote control device and also instruct the user to perform an operation for charging the remote control device (operation of vibrating the remote control device).

The control circuit may output a completion notification signal when the remaining power of the storage section becomes larger than the predetermined amount, and the electronic apparatus may notify the user of completion of charging of the remote control device in response to the completion notification signal. With this configuration, it is possible to stop the operation for charging the remote control device (operation of vibrating the remote control device).

The electronic apparatus may reproduce at least one of an instruction image and an instruction sound for instructing the user to vibrate the remote control device in response to the vibration instruction signal. By reproducing at least one of the instruction image and the instruction sound, it is possible to notify the user of power shortage of the remote control device.

Alternatively, the electronic apparatus may be switchable between an image instruction mode and a sound instruction mode, and reproduce an instruction image for instructing the user to vibrate the remote control device in response to the vibration instruction signal in the image instruction mode, and an instruction sound for instructing the user to vibrate the remote control device in response to the vibration instruction signal in the sound instruction mode. With this configuration, it is possible to make arbitrary setting on which one of the instruction image and the instruction sound is to be reproduced when the remaining power of the remote control device becomes insufficient.

Alternatively, the electronic apparatus may be able to reproduce an instruction image and an instruction sound for instructing the user to vibrate the remote control device in response to the vibration instruction signal, and the control circuit may be switchable between an image instruction control mode and a sound instruction control mode, and output an image control signal for directing the electronic apparatus to reproduce the instruction image as the vibration instruction signal in the image instruction control mode, and a sound control signal for directing the electronic apparatus to reproduce the instruction sound as the vibration instruction signal in the sound instruction control mode. With this configuration, it is possible to make arbitrary setting on which one of the instruction image and the instruction sound is to be reproduced when the remaining power of the remote control device becomes insufficient.

The remote control device may remotely control the electronic apparatus in response to user operation. With this configuration, it is possible to notify the user of power shortage of the remote control device via the electronic apparatus that is the object to be operated by the remote control device.

Alternatively, the remote control device may remotely control an electronic apparatus different from the electronic apparatus that instructs the user to vibrate the remote control device, in response to user operation. With this configuration, it is possible to notify the user of power shortage of the remote control device via an electronic apparatus that is not the object to be operated by the remote control device.

The remote control device may remotely control the electronic apparatus in response to at least either user operation or externally applied vibrations, and the electronic apparatus may selectively present a plurality of games including a vibration game that proceeds by vibrating the remote control device, and change a currently presenting game to the vibration game in response to the vibration instruction signal. By changing the currently presenting game to a vibration game, it is possible to notify the user of power shortage of the remote control device. Also, by presenting a vibration game (game involving vibration operation of the remote control device), it is possible to charge the remote control device by allowing the user to play the vibration game.

The control circuit may turn the switch off when the remaining power of the storage section becomes larger than the predetermined amount. With this configuration, overcharging of the storage section can be prevented.

The remote control device may further include an external power input section for supplying external power to the storage section. With this configuration, even in the event that the vibration instruction signal cannot be transmitted due to power shortage of the remote control device, such power shortage can be solved.

According to another aspect of the present disclosure, the remote control device is a remote control device configured to output a vibration instruction signal to an electronic apparatus that can instruct the user to vibrate the remote control device in response to the vibration instruction signal, including: a vibration power generator configured to convert externally applied vibrations to electric power; a storage section charged with the electric power obtained by the vibration power generator; a switch provided between the vibration power generator and the storage section; and a control circuit configured to output the vibration instruction signal and turn the switch on when the remaining power of the storage section becomes smaller than a predetermined amount. In this remote control device, it is possible to inform the user of power shortage of the remote control device and also instruct the user to perform an operation for charging the remote control device.

According to yet another aspect of the present disclosure, the remote control device includes: a vibration power generator configured to convert externally applied vibrations to electric power; a storage section charged with the electric power obtained by the vibration power generator; a switch provided between the vibration power generator and the storage section; a control circuit configured to output a vibration instruction signal and turn the switch on when the remaining power of the storage section becomes smaller than a predetermined amount; and an electronic circuit configured to instruct the user to vibrate the remote control device in response to the vibration instruction signal. In this remote control device, it is possible to inform the user of power shortage of the remote control device and also instruct the user to perform an operation for charging the remote control device.

BRIEF DESCRIPTION OF THE DRAWINGS

FIG. 1 is a view showing an example configuration of a communication system of a first embodiment.

FIG. 2A is a view showing an example of an instruction image for instructing the user to vibrate a remote control device.

FIG. 2B is a view showing an example of a notification image for notifying the user of completion of charging of the remote control device.

FIG. 10A is a view showing an example of an instruction image for instructing the user to vibrate the remote control device.

FIG. 10B is a view showing an example of a notification image for notifying the user of completion of charging of the remote control device.

DETAILED DESCRIPTION

Figure 3:
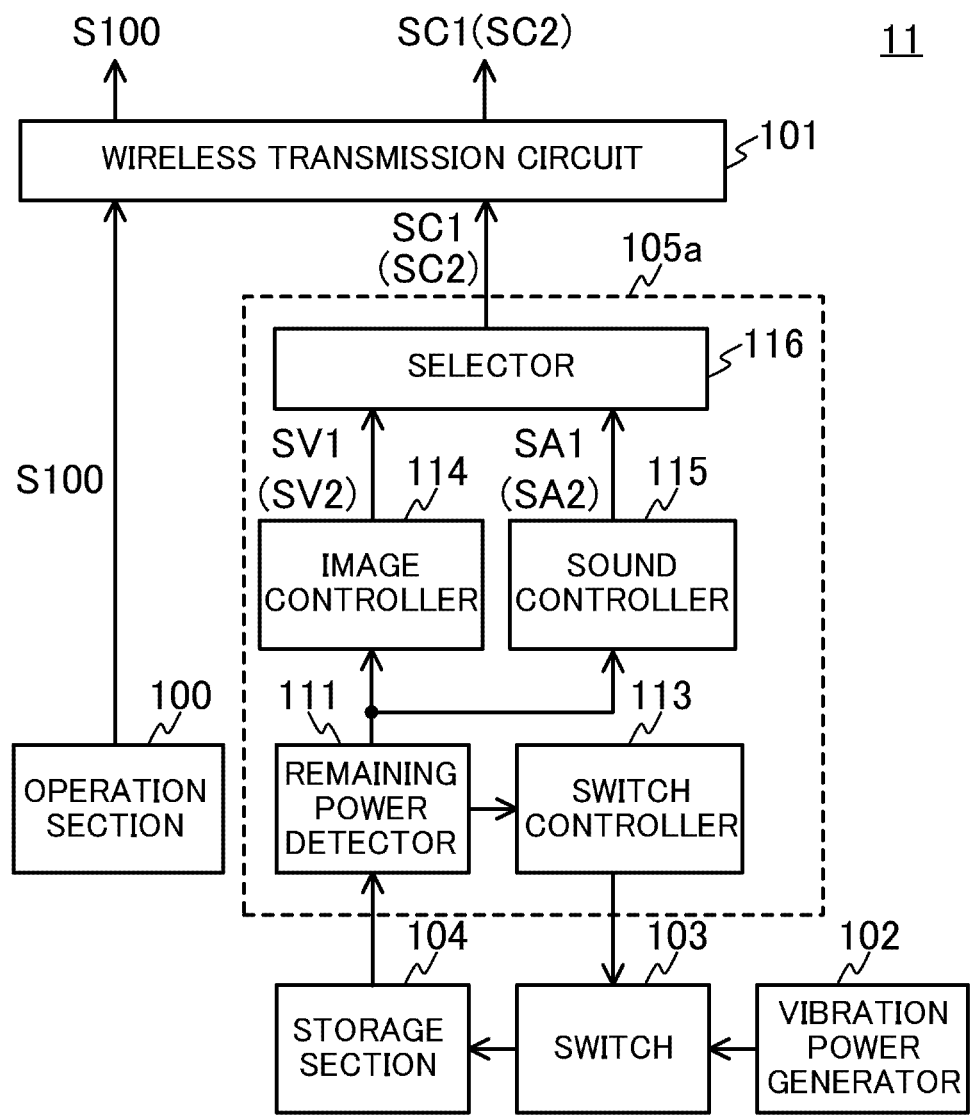
FIG. 3 is a view showing a variation of the remote control device in FIG. 1.

Embodiments of the present disclosure will be described hereinafter in detail with reference to the accompanying drawings. It should be noted that the same or corresponding components are denoted by the same reference characters throughout the drawings, and that description of such components will not be repeated.

First Embodiment

FIG. 1 shows an example configuration of a communication system of the first embodiment. The communication system includes a remote control device 11 and an electronic apparatus 12. The remote control device 11 remotely controls the electronic apparatus 12 in response to user operation (operation given by the user). The electronic apparatus 12, which is a sound/image reproduction apparatus having a display, a speaker, a sound processing circuit, an image processing circuit, a control circuit, etc., reproduces an image and sound in response to the remote control by the remote control device 11. The electronic apparatus 12 may be a TV set, and the remote control device 11 may be a TV remote control, for example. The remote control device 11 and the electronic apparatus 12 have a function of instructing the user to vibrate the remote control device 11 when the remote control device 11 becomes short of power, a function of notifying the user of completion of charging of the remote control device, etc.

The remote control device 11 includes an operation section 100, a wireless transmission circuit 101, a vibration power generator 102, a switch 103, a storage section 104, and a control circuit 105.

The operation section 100, operated by the user of the remote control device 11, has a plurality of buttons, for example. The operation section 100 outputs an operation signal S100 for remotely controlling the electronic apparatus 12. The wireless transmission circuit 101 transmits the operation signal S100 from the operation section 100 as a wireless signal. Receiving the operation signal S100 from the remote control device 11, the electronic apparatus 12 reproduces an image and sound in response to the operation signal S100. For example, assuming that the electronic apparatus 12 is a TV set, when a channel operation is made in the operation section 100, the electronic apparatus 12 reproduces an image and sound corresponding to the channel designated by the channel operation.

The vibration power generator 102 converts externally applied vibrations (vibrations applied to the remote control device 11) to electric power. The vibration power generator 102 includes, for example, a vibration power generation element that converts vibrations (mechanical vibrations) to electric power using electrostatic induction, a piezoelectric effect, electromagnetic induction, etc. The switch 103 is provided between the vibration power generator 102 and the storage section 104. The storage section 104 is charged with electric power (electric power obtained by the vibration power generator 102) supplied via the switch 103. The storage section 104 is constituted by an electronic component capable of storing charges such as a rechargeable secondary battery and a capacitor, for example. The electric power stored in the storage section 104 is used as operating power for the components (the operation section 100, the wireless transmission circuit 101, the control circuit 105, etc.) of the remote control device 11.

The control circuit 105 outputs a vibration instruction signal SC1 and a completion notification signal SC2 in accordance with the remaining power of the storage section 104. Also, the control circuit 105 controls on/off of the switch 103 in accordance with the remaining power of the storage section 104. The control circuit 105 includes, for example, a remaining power detector 111 that detects the remaining power of the storage section 104, an operation controller 112, and a switch controller 113.

The operation controller 112 outputs the vibration instruction signal SC1 when the remaining power of the storage section 104 detected by the remaining power detector 111 becomes smaller than a predetermined amount (e.g., the minimum power amount with which the components of the remote control device 11 can be operated). The wireless transmission circuit 101 transmits the vibration instruction signal SC1 from the control circuit 105 as a wireless signal. The electronic apparatus 12, receiving the vibration instruction signal SC1 from the remote control device 11, reproduces an instruction image (an image for instructing the user to vibrate the remote control device 11) in response to the vibration instruction signal SC1. The instruction image may include a text message like "Shake the remote control" as in FIG. 2A, or an icon (graphic mark) that suggests vibrating the remote control device 11. The electronic apparatus 12 may otherwise reproduce an instruction sound (a sound for instructing the user to vibrate the remote control device 11), or may reproduce both the instruction image and the instruction sound, in response to the vibration instruction signal SC1. The instruction sound may be a voice message like "Shake the remote control," or a predetermined beep sound or melody sound.

Also, the switch controller 113 turns the switch 103 on when the remaining power of the storage section 104 becomes smaller than the predetermined amount, whereby the electric power generated by the vibration power generator 102 is supplied to the storage section 104.

Once the storage section 104 is charged to the extent where the remaining power of the storage section 104 is larger than the predetermined amount, the operation controller 112 outputs a completion notification signal SC2. The wireless transmission circuit 101 transmits the completion notification signal SC2 from the control circuit 105 as a wireless signal. The electronic apparatus 12, receiving the completion notification signal SC2 from the remote control device 11, reproduces a notification image (an image for notifying the user of completion of charging of the remote control device 11) in response to the completion notification signal SC2. The notification image may include a text message like "Charging has been completed" as in FIG. 2B, or an icon (graphic mark) that suggests completion of charging of the remote control device 11. The electronic apparatus 12 may otherwise reproduce a notification sound (a sound for notifying the user of completion of charging of the remote control device 11), or may reproduce both the instruction image and the instruction sound, in response to the completion notification signal SC2. The notification sound may be a voice message like "Charging has been completed," or a predetermined beep sound or melody sound.

Also, the switch controller 113 turns the switch 103 off when the remaining power of the storage section 104 becomes larger than the predetermined amount, whereby supply of the electric power generated by the vibration power generator 102 to the storage section 104 is stopped.

As described above, by instructing the user to vibrate the remote control device 11, the user can be notified of power shortage of the remote control device 11. This permits the user to know whether the remote control device 11 can be used without charging. This also permits the user to determine, when the remote control device 11 becomes unusable, whether this is due to power shortage of the remote control device 11 or a breakdown thereof. Moreover, since the user can be instructed to perform the operation for charging the remote control device 11 (operation of vibrating the remote control device 11), power shortage of the remote control device 11 can be solved.

Also, by notifying the user of completion of charging of the remote control device 11, the user can stop the operation for charging the remote control device 11 (operation of vibrating the remote control device 11). This can prevent the remote control device 11 from becoming out of order due to application of vibrations more than necessary.

Moreover, by controlling on/off of the switch 103 in accordance with the remaining power of the storage section 104, overcharging of the storage section 104 can be prevented. Note that the switch 103 and the switch controller 113 may not be provided, and the electric power generated by the vibration power generator 102 may be directly supplied to the storage section 104.

The electronic apparatus 12 may be a sound reproduction apparatus (e.g., an audio apparatus) having a function of reproducing the instruction sound (notification sound) in response to the vibration instruction signal SC1 (completion notification signal SC2), or an image reproduction apparatus having a function of reproducing the instruction image (notification image) in response to the vibration instruction signal SC1 (completion notification signal SC2).

Variation of First Embodiment

The electronic apparatus 12 may be switchable between an image instruction mode (mode of reproducing the instruction image in response to the vibration instruction signal SC1) and a sound instruction mode (mode of reproducing the instruction sound in response to the vibration instruction signal SC1), in accordance with user setting (or randomly). Likewise, the electronic apparatus 12 may be switchable between an image notification mode (mode of reproducing the notification image in response to the completion notification signal SC2) and a sound notification mode (mode of reproducing the notification sound in response to the completion notification signal SC2), in accordance with user setting (or randomly).

Alternatively, the remote control device 11 may be switchable between an image instruction control mode (mode of directing the electronic apparatus 12 to reproduce the instruction image) and a sound instruction control mode (mode of directing the electronic apparatus 12 to reproduce the instruction sound), and also may be switchable between an image notification control mode (mode of directing the electronic apparatus 12 to reproduce the notification image) and a sound notification control mode (mode of directing the electronic apparatus 12 to reproduce the notification sound), in accordance with user setting (or randomly). The remote control device 11 may include a control circuit 105a shown in FIG. 3 in place of the control circuit 105 shown in FIG. 1, for example. The control circuit 105a includes an image controller 114, a sound controller 115, and a selector 116, in place of the operation controller 112 shown in FIG. 1.

The image controller 114 and the sound controller 115 respectively output an image control signal SV1 and a sound control signal SA1 when the remaining power of the storage section 104 becomes smaller than a predetermined amount. The selector 116 outputs either one of the image control signal SV1 and the sound control signal SA1 as the vibration instruction signal SC1 in accordance with user setting (or randomly). The electronic apparatus 12 reproduces the instruction image when the image control signal SV1 is selected as the vibration instruction signal SC1 (in the image instruction control mode), and reproduces the instruction sound when the sound control signal SA1 is selected as the vibration instruction signal SC1 (in the sound instruction control mode). In other words, the image control signal SV1 is a control signal for directing the electronic apparatus 12 to reproduce the instruction image, and the sound control signal SA1 is a control signal for directing the electronic apparatus 12 to reproduce the instruction sound.

Once the remaining power of the storage section 104 becomes larger than the predetermined amount, the image controller 114 and the sound controller 115 respectively output an image control signal SV2 and a sound control signal SA2. The selector 116 outputs either one of the image control signal SV2 and the sound control signal SA2 as the completion notification signal SC2 in accordance with user setting (or randomly). The electronic apparatus 12 reproduces the notification image when the image control signal SV2 is selected as the completion notification signal SC2 (in the image notification control mode), and reproduces the notification sound when the sound control signal SA2 is selected as the completion notification signal SC2 (in the sound notification control mode). In other words, the image control signal SV2 is a control signal for directing the electronic apparatus 12 to reproduce the notification image, and the sound control signal SA2 is a control signal for directing the electronic apparatus 12 to reproduce the notification sound.

With the above configuration, it is possible to make arbitrary setting on which one of the instruction image and the instruction sound is to be reproduced when the remaining power of the remote control device 11 becomes insufficient. It is also possible to make arbitrary setting on which one of the notification image and the notification sound is be reproduced when charging of the remote control device 11 is completed. For example, the setting on which to be reproduced, the instruction image or the instruction sound, can be made depending on the user's preferences. Alternatively, the setting on which to be reproduced may be made randomly, to render which is reproduced, the instruction image or the instruction sound, unpredictable, and thus give an opportunity for the user to get pleasure from the notification of power shortage of the remote control device 11.

The selector 116 may be made switchable between the image instruction control mode and the sound instruction control mode in accordance with the remaining power of the storage section 104. For example, the selector 116 may output the sound control signal SA1 as the vibration instruction signal SC1 when the remaining power of the storage section 104 is smaller than a first predetermined amount and larger than a second predetermined amount (amount smaller than the first predetermined amount), and output the image control signal SV1 as the vibration instruction signal SC1 when the remaining power of the storage section 104 is smaller than the second predetermined amount. By switching the means of notification of power shortage of the remote control device 11 according to the degree of the power shortage of the remote control device 11 in this way, the effect on the user (effect exerted to urge the user to execute the operation of vibrating the remote control device 11) can be changed. For example, the effect on the user can be increased as the power shortage of the storage section 104 worsens.

[External Power Input Section]

Figure 4:
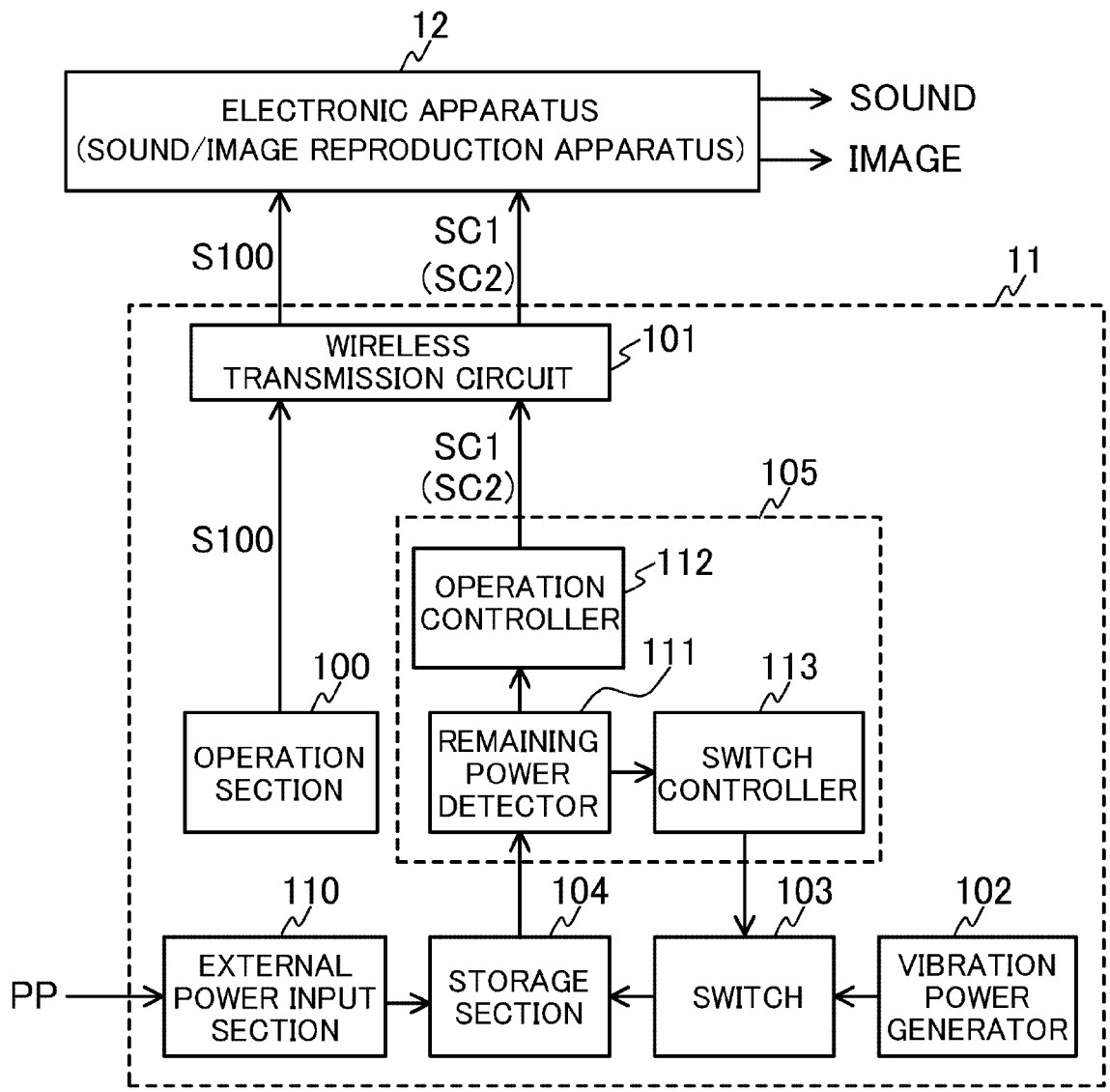
FIG. 4 is a view shown to describe an external power input section.

The remote control device 11 may further include an external power input section 110 shown in FIG. 4. The external power input section 110 is connected to an external power supply (not shown) and supplies external power PP from the external power supply to the storage section 104. The storage section 104 is charged with the external power PP. With this configuration, even in the event that the vibration instruction signal SC1 cannot be transmitted due to power shortage of the remote control device 11, the power shortage can be solved by supply of the external power PP.

[Object to be Operated by Remote Control Device]

Figure 5:
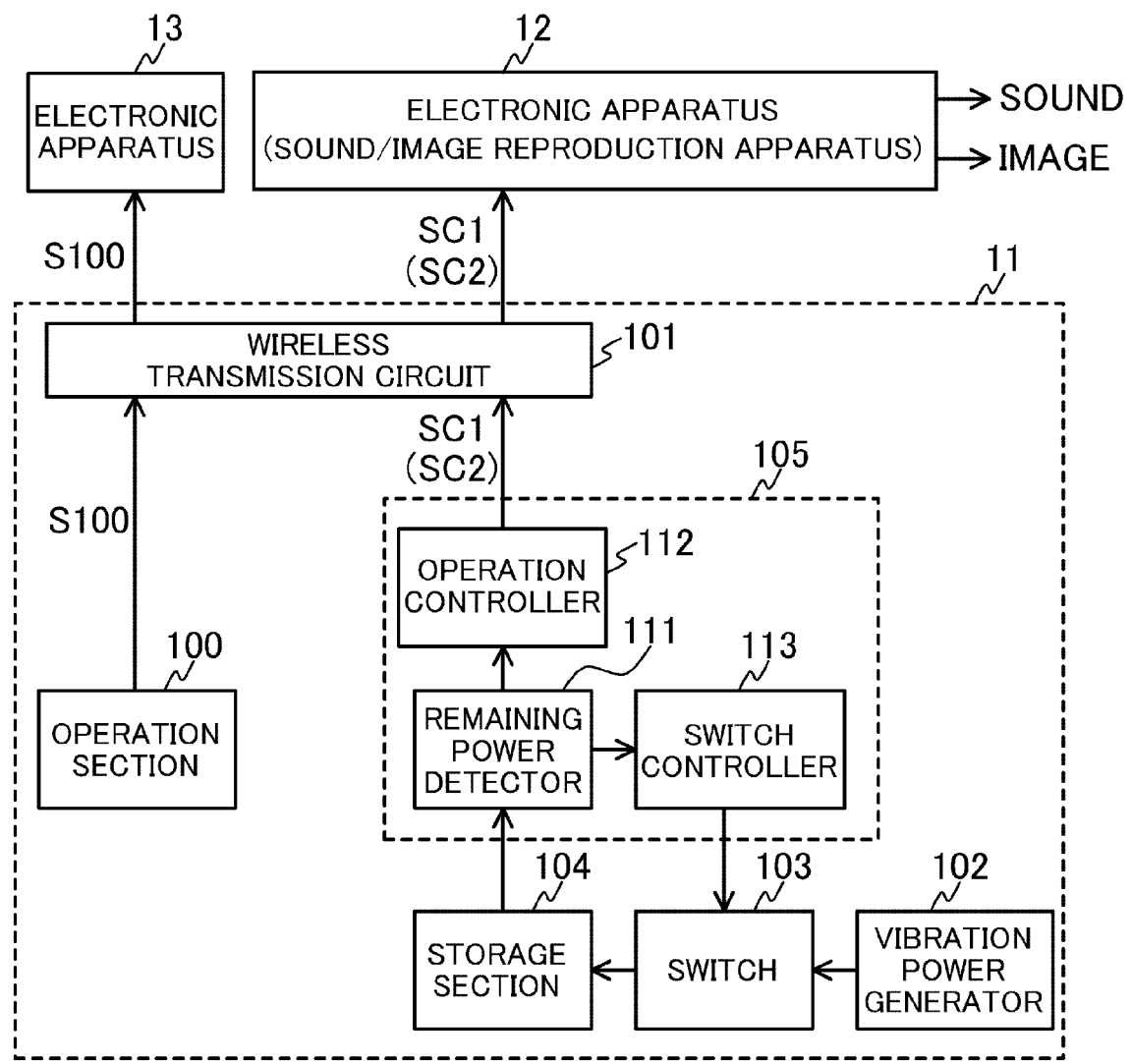
FIG. 5 is a view shown to describe an object to be operated by the remote control device.

As shown in FIG. 5, the remote control device 11 may remotely control an electronic apparatus 13 (e.g., a TV set, an audio apparatus, a gate machine, an air conditioner, a lighting fixture, etc.) different from the electronic apparatus 12, in response to user operation. The electronic apparatus 13 is controlled with the operation signal S100 from the remote control device 11. With this configuration, the user can be notified of power shortage of the remote control device 11 via the electronic apparatus 12 that is not the object to be operated by the remote control device 11. For example, when the electronic apparatus 12 is a TV set, the electronic apparatus 13 is an air conditioner, and the remote control device 11 is a remote control for the air conditioner, the user can be notified of power shortage of the remote control for the air conditioner via the TV set.

Second Embodiment

Figure 6:
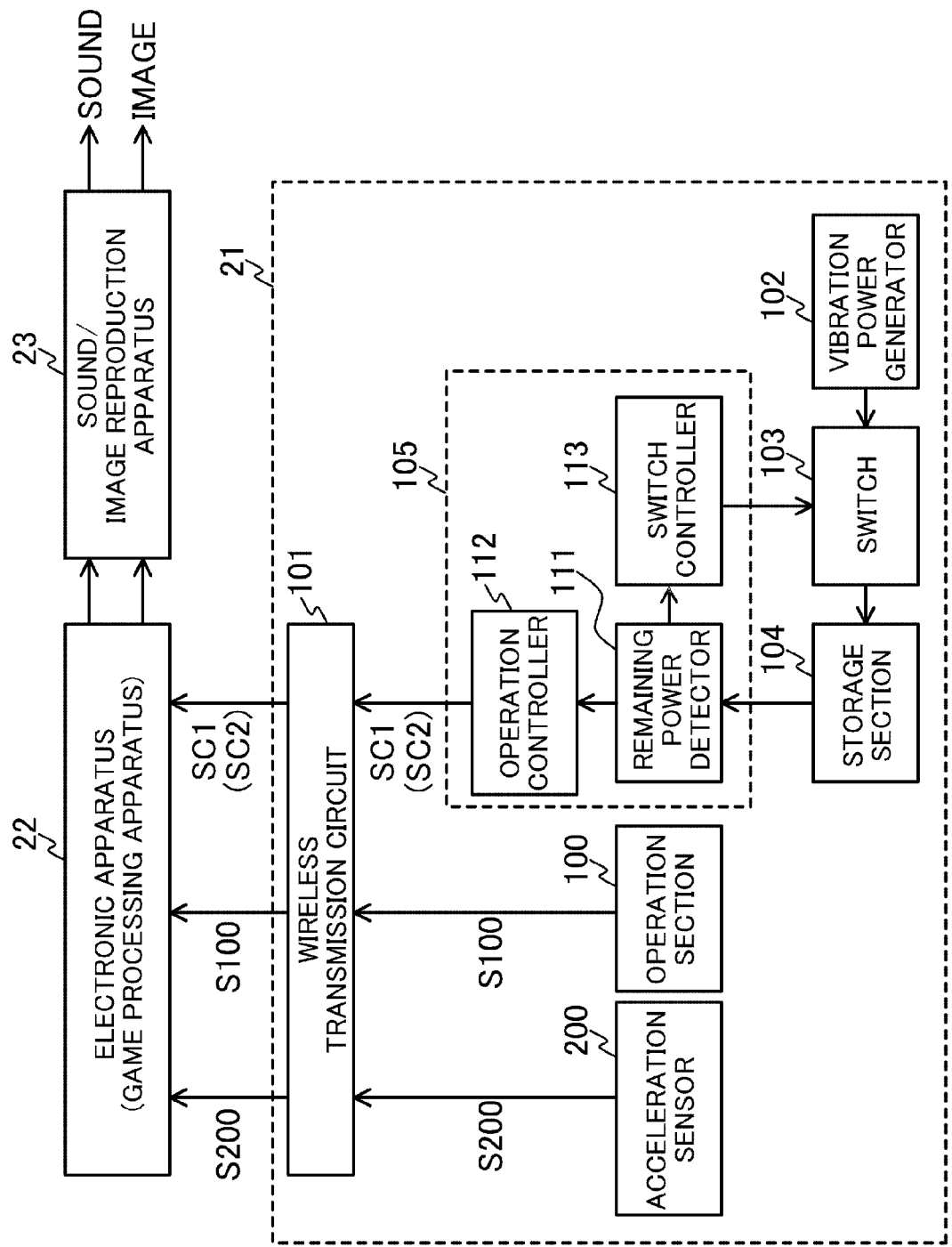
FIG. 6 is a view showing an example configuration of a communication system of a second embodiment.

FIG. 6 shows an example configuration of a communication system of the second embodiment. This communication system includes a remote control device 21, an electronic apparatus 22, and a sound/image reproduction apparatus 23. The remote control device 21 remotely controls the electronic apparatus 22 in response to at least either user operation or externally applied vibrations. The electronic apparatus 22, which is a game processing apparatus that executes game programs, selectively presents a plurality of games including a vibration game (game that proceeds by vibrating the remote control device 21) via the sound/image reproduction apparatus 23. The vibration game may be a sports game, for example, that gives the user pseudo experience of exercising a sport (boxing, tennis, etc.) by considering the remote control device 21 as a tool of the sport (a boxing glove, a tennis racket, etc.). The electronic apparatus 22 controls game selection and game proceedings in response to the remote control by the remote control device 21. The electronic apparatus 22 may be a game machine body, the sound/image reproduction apparatus 23 may be a TV set, and the remote control device 21 may be a game controller, for example.

The remote control device 21 and the electronic apparatus 22 have a function for instructing the user to vibrate the remote control device 21 when the remaining power of the remote control device 21 becomes insufficient and a function for notifying the user of completion of charging of the remote control device 21.

The remote control device 21 includes an acceleration sensor 200 in addition to the components of the remote control device 11 shown in FIG. 1. The acceleration sensor 200 outputs an acceleration signal S200 in accordance with externally applied vibrations (acceleration). The wireless transmission circuit 101 outputs the operation signal S100 from the operation section 100 and the acceleration signal S200 from the acceleration sensor 200 as wireless signals.

The electronic apparatus 22 executes game programs for presenting a plurality of games. The electronic apparatus 22 also receives the operation signal S100 and the acceleration signal S200 from the remote control device 21 and controls image processing and sound processing in response to the operation signal S100 and the acceleration signal S200. The sound/image reproduction apparatus 23 reproduces an image and sound based on the result of the image processing (image signal) and the result of the sound processing (sound signal) from the electronic apparatus 22.

Figure 7B:
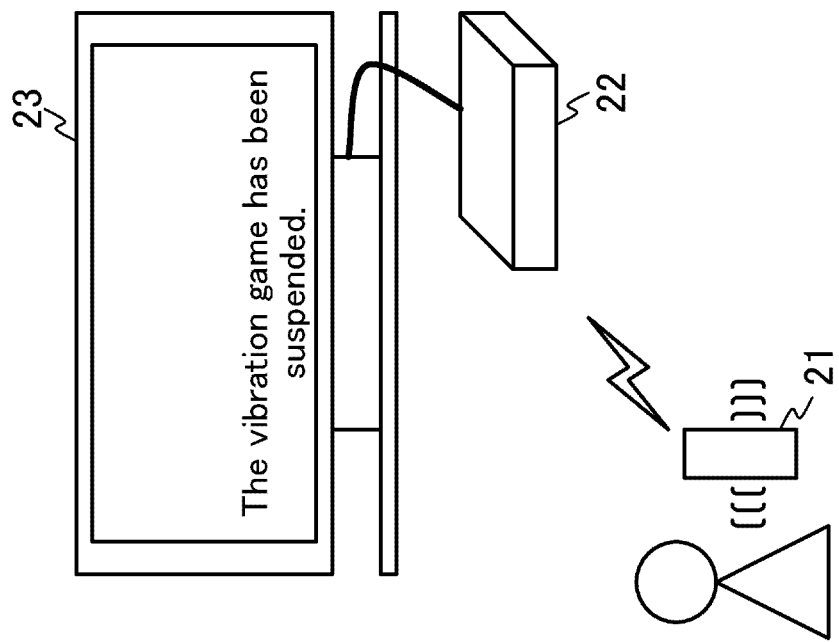
FIG. 7B is a view showing an example of an image for notifying the user that the vibration game has been suspended.
Figure 7A:
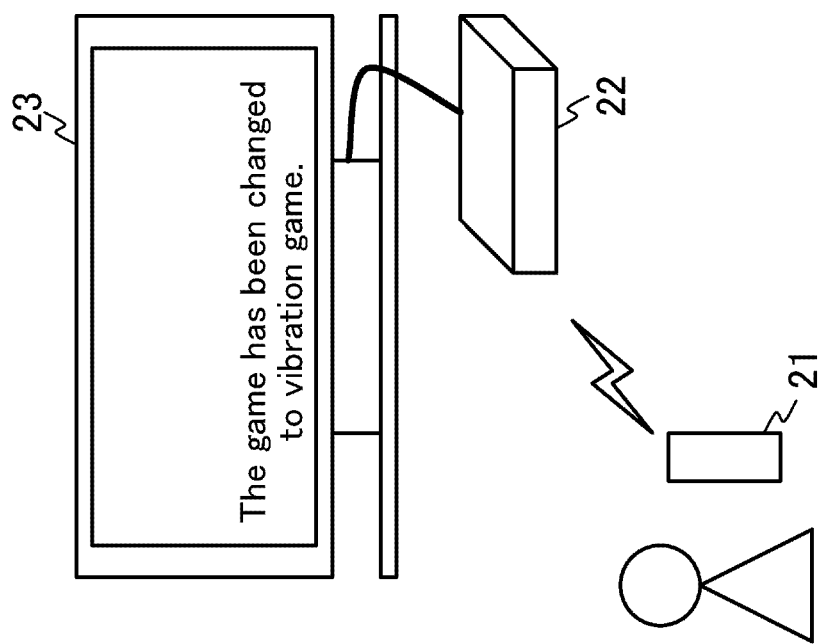
FIG. 7A is a view showing an example of an image for notifying the user that the game has been changed to a vibration game.

In addition, the electronic apparatus 22 receives the vibration instruction signal SC1 from the remote control device 21 and changes the currently presenting game to the vibration game in response to the vibration instruction signal SC1. With this change to the vibration game, the electronic apparatus 22 may make the sound/image reproduction apparatus 23 reproduce an image for notifying the user of this change to the vibration game (e.g., a text message like "The game has been changed to vibration game" as shown in FIG. 7A), or make the sound/image reproduction apparatus 23 reproduce at least either the instruction image or the instruction sound.

Moreover, the electronic apparatus 22 receives the completion notification signal SC2 from the remote control device 21 and suspends the currently presenting vibration game in response to the completion notification signal SC2. With this suspension of the vibration game, the electronic apparatus 22 may make the sound/image reproduction apparatus 23 reproduce an image for notifying the user of this suspension of the vibration game (e.g., a text message like "The vibration game has been suspended" as shown in FIG. 7B), or make the sound/image reproduction apparatus 23 reproduce at least either the notification image or the notification sound.

As described above, by changing the currently presenting game to the vibration game, the user can be notified of power shortage of the remote control device 21. Also, by presenting a vibration game (game involving vibration operation of the remote control device 21) to allow the user to play the vibration game, the remote control device 21 can be charged.

In addition, by suspending the vibration game, the user can be notified of completion of charging of the remote control device 21. With this notification, the user can stop the operation for charging the remote control device 21 (operation of vibrating the remote control device 21).

The remote control device 21 may further include the external power input section 110 shown in FIG. 4. With this configuration, even in the event that the vibration instruction signal SC1 cannot be transmitted due to power shortage of the remote control device 21, the power shortage can be solved by supply of the external power PP.

Variation of Second Embodiment

The electronic apparatus 22 may be switchable among a forced change mode (mode of changing the currently presenting game to the vibration game in response to the vibration instruction signal SC1), an image instruction mode (mode of directing the sound/image reproduction apparatus 23 to reproduce the instruction image in response to the vibration instruction signal SC1), and a sound instruction mode (mode of directing the sound/image reproduction apparatus 23 to reproduce the instruction sound in response to the vibration instruction signal SC1), in accordance with user setting (or randomly). Likewise, the electronic apparatus 22 may be switchable among a forced suspension mode (mode of suspending the currently presenting vibration game in response to the completion notification signal SC2), an image notification mode (mode of directing the sound/image reproduction apparatus 23 to reproduce the notification image in response to the completion notification signal SC2), and a sound notification mode (mode of directing the sound/image reproduction apparatus 23 to reproduce the notification sound in response to the completion notification signal SC2), in accordance with user setting (or randomly).

Figure 8:
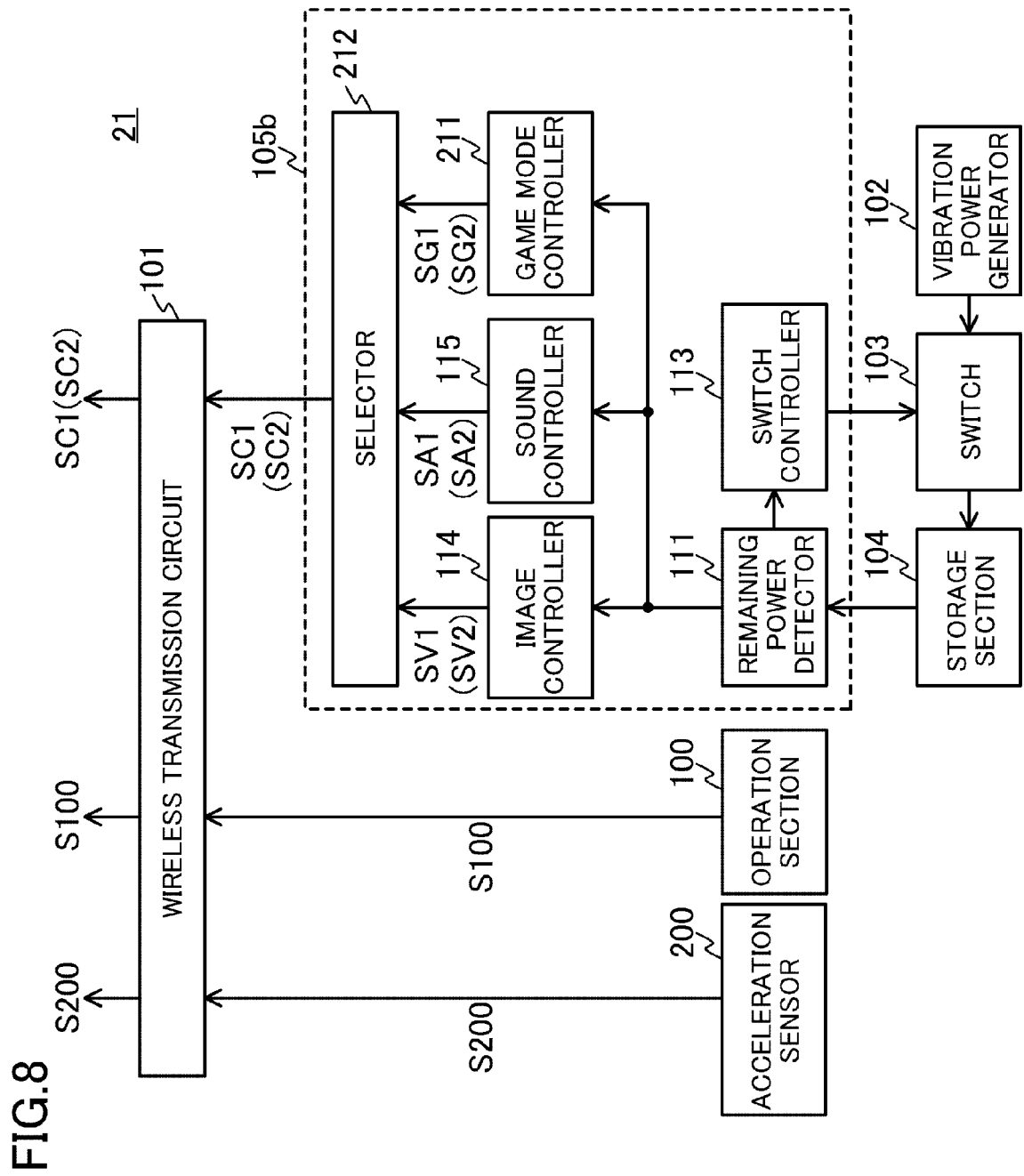
FIG. 8 is a view showing a variation of a remote control device in FIG. 6.

Alternatively, the remote control device 21 may be switchable among a forced change control mode (mode of directing the electronic apparatus 22 to change the game to the vibration game), the image instruction control mode, and the sound instruction control mode, in accordance with user setting (or randomly). Likewise, the remote control device 21 may be switchable among a forced suspension control mode (mode of directing the electronic apparatus 22 to suspend the vibration game), the image notification control mode, and the sound notification control mode, in accordance with user setting (or randomly). The remote control device 21 may include a control circuit 105b shown in FIG. 8, for example, in place of the control circuit 105 shown in FIG. 6. The control circuit 105b includes an image controller 114, the sound controller 115, a game mode controller 211, and a selector 212, in place of the operation controller 112 shown in FIG. 6.

When the remaining power of the storage section 104 becomes smaller than a predetermined amount, the game mode controller 211 outputs a game mode control signal SG1. The selector 212 outputs any one of the image control signal SV1, the sound control signal SA1, and the game mode control signal SG1 as the vibration instruction signal SC1 in accordance with user setting (or randomly). The electronic apparatus 22 directs the sound/image reproduction apparatus 23 to reproduce the instruction image when the image control signal SV1 is selected as the vibration instruction signal SC1 (in the image instruction control mode), or directs the sound/image reproduction apparatus 23 to reproduce the instruction sound when the sound control signal SA1 is selected as the vibration instruction signal SC1 (in the sound instruction control mode). Otherwise, when the game mode control signal SG1 is selected as the vibration instruction signal SC1 (in a forced switch control mode), the electronic apparatus 22 changes the currently presenting game to the vibration game. In other words, the game mode control signal SG1 is a control signal for directing the electronic apparatus 22 to execute change of the game to the vibration game.

When the remaining power of the storage section 104 becomes larger than the predetermined amount, the game mode controller 211 outputs a game mode control signal SG2. The selector 212 outputs any one of the image control signal SV2, the sound control signal SA2, and the game mode control signal SG2 as the completion notification signal SC2 in accordance with user setting (or randomly). The electronic apparatus 22 directs the sound/image reproduction apparatus 23 to reproduce the notification image when the image control signal SV2 is selected as the completion notification signal SC2 (in the image notification control mode), or directs the sound/image reproduction apparatus 23 to reproduce the notification sound when the sound control signal SA2 is selected as the completion notification signal SC2 (in the sound notification control mode). Otherwise, when the game mode control signal SG2 is selected as the completion notification signal SC2 (in the forced suspension mode), the electronic apparatus 22 suspends the currently presenting vibration game. In other words, the game mode control signal SG2 is a control signal for directing the electronic apparatus 22 to execute suspension of the vibration game.

With the above configuration, it is possible to make arbitrary setting on which one of change of the game to the vibration game, reproduction of the instruction image, and reproduction of the instruction sound is to be executed when the remaining power of the remote control device 21 becomes insufficient. It is also possible to make arbitrary setting on which one of suspension of the vibration game, reproduction of the notification image, and reproduction of the notification sound is to be executed when charging of the remote control device 21 is completed.

The selector 212 may select the forced change control mode, the image instruction control mode, or the sound instruction control mode in accordance with the remaining power of the storage section 104. For example, the selector 212 may output the sound control signal SA1 as the vibration instruction signal SC1 when the remaining power of the storage section 104 is smaller than a first predetermined amount and larger than a second predetermined amount (amount smaller than the first predetermined amount), output the image control signal SV1 as the vibration instruction signal SC1 when the remaining power of the storage section 104 is smaller than the second predetermined amount and larger than a third predetermined amount (amount smaller than the second predetermined amount), and output the game mode control signal SG1 as the vibration instruction signal SC1 when the remaining power of the storage section 104 is smaller than the third predetermined amount. With this configuration, the effect on the user (effect exerted to urge the user to execute the operation of vibrating the remote control device 21) can be changed according to the degree of the power shortage of the storage section 104.

Third Embodiment

Figure 9:
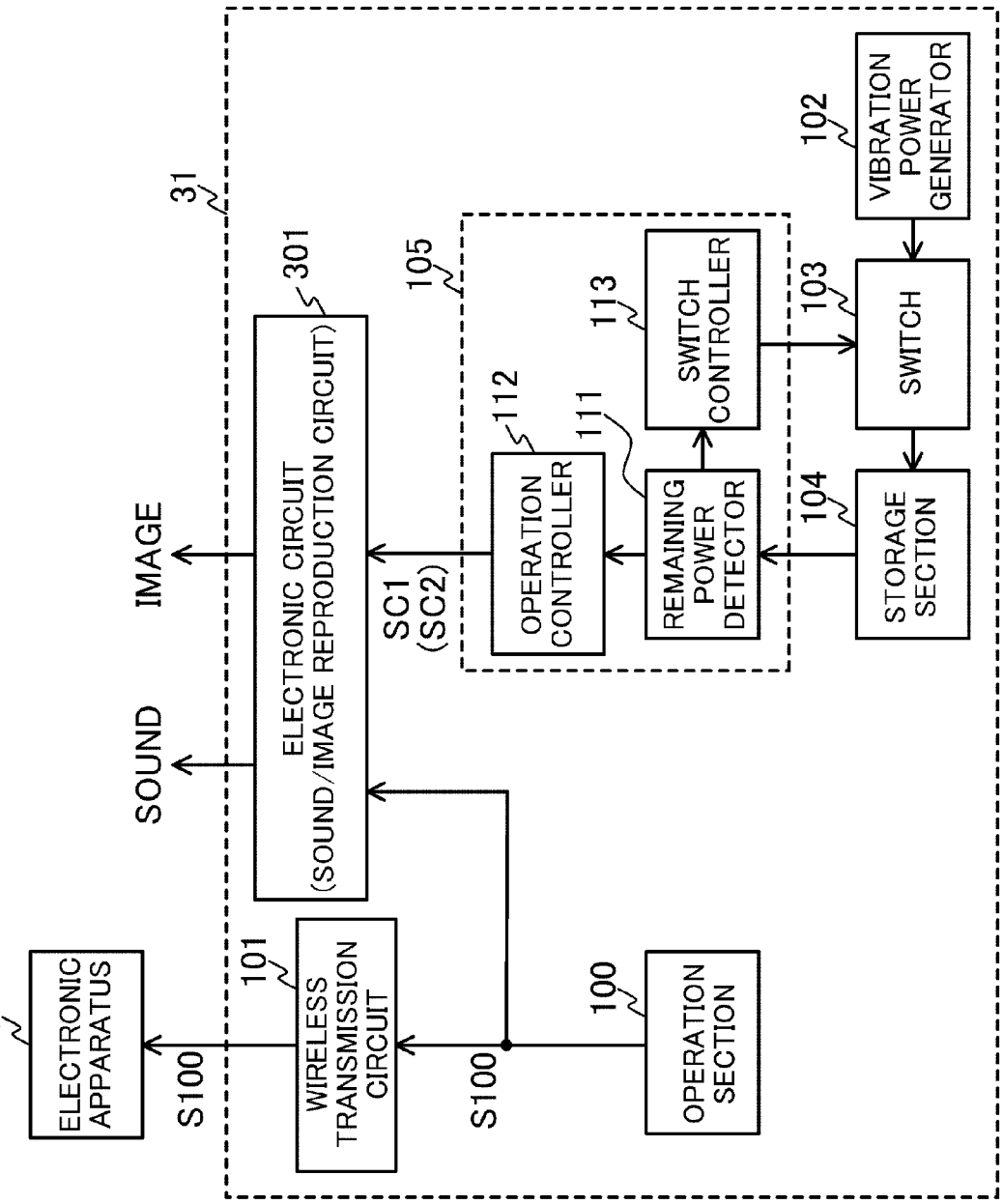
FIG. 9 is a view showing an example configuration of a remote control device of a third embodiment.

FIG. 9 shows an example configuration of a remote control device 31 of the third embodiment. The remote control device 31 remotely controls an electronic apparatus 32 in response to user operation. The electronic apparatus 32 may be a TV set, an audio apparatus, an air conditioner, a lighting fixture, etc. The remote control device 31 has a function for instructing the user to vibrate the remote control device 31 when the remote control device 31 becomes short of power, a function for notifying the user of completion of charging of the remote control device 31, etc.

The remote control device 31 includes an electronic circuit 301 in addition to the components of the remote control device 11 shown in FIG. 1. The electronic circuit 301, which is a sound/image reproduction circuit having a display, a speaker, an image processing circuit, a sound processing circuit, a control circuit, etc., reproduces an image and sound according to the operation signal S100 from the operation section 100. For example, assuming that the remote control device 31 is a remote control for an air conditioner, the electronic circuit 301 executes display of the set temperature, output of beep sound, etc. when an operation for setting the temperature of the air conditioner is given to the operation section 100.

The electronic circuit 301 reproduces an instruction image (e.g., a text message like "Shake the remote control" as shown in FIG. 10A) in response to the vibration instruction signal SC1 from the control circuit 105. The electronic circuit 301 may otherwise reproduce an instruction sound or may reproduce both the instruction image and the instruction sound, in response to the vibration instruction signal SC1.

Also, the electronic circuit 301 reproduces a notification image (e.g., a text message like "Charging has been completed" as shown in FIG. 10B) in response to the completion notification signal SC2 from the control circuit 105. The electronic circuit 301 may otherwise reproduce a notification sound or may reproduce both the notification image and the notification sound, in response to the completion notification signal SC2.

As described above, by instructing the user to vibrate the remote control device 31, the user can be notified of power shortage of the remote control device 31. Also, since the user can be instructed to perform the operation for charging the remote control device 31 (operation of vibrating the remote control device 31), power shortage of the remote control device 31 can be solved. Moreover, by being notified of completion of charging of the remote control device 31, the user can stop the operation for charging the remote control device 11 (operation of vibrating the remote control device 11).

The electronic circuit 301 may be a sound reproduction circuit having a function of reproducing the instruction sound (notification sound) in response to the vibration instruction signal SC1 (completion notification signal SC2), or an image reproduction circuit having a function of reproducing the instruction image (notification image) in response to the vibration instruction signal SC1 (completion notification signal SC2).

Variation of Third Embodiment

The electronic circuit 301 may be switchable between the image instruction mode and the sound instruction mode, and also switchable between the image notification mode and the sound notification mode, in accordance with user setting (or randomly). Alternatively, the remote control device 31 may be switchable between the image instruction control mode and the sound instruction control mode, and also switchable between the image notification control mode and the sound notification control mode, in accordance with user setting (or randomly). The remote control device 31 may include the control circuit 105a shown in FIG. 3, for example, in place of the control circuit 105 shown in FIG. 9. Also, the remote control device 31 may further include the external power input section 110 shown in FIG. 4.

(Example Configuration of Vibration Power Generator)

Figure 11:
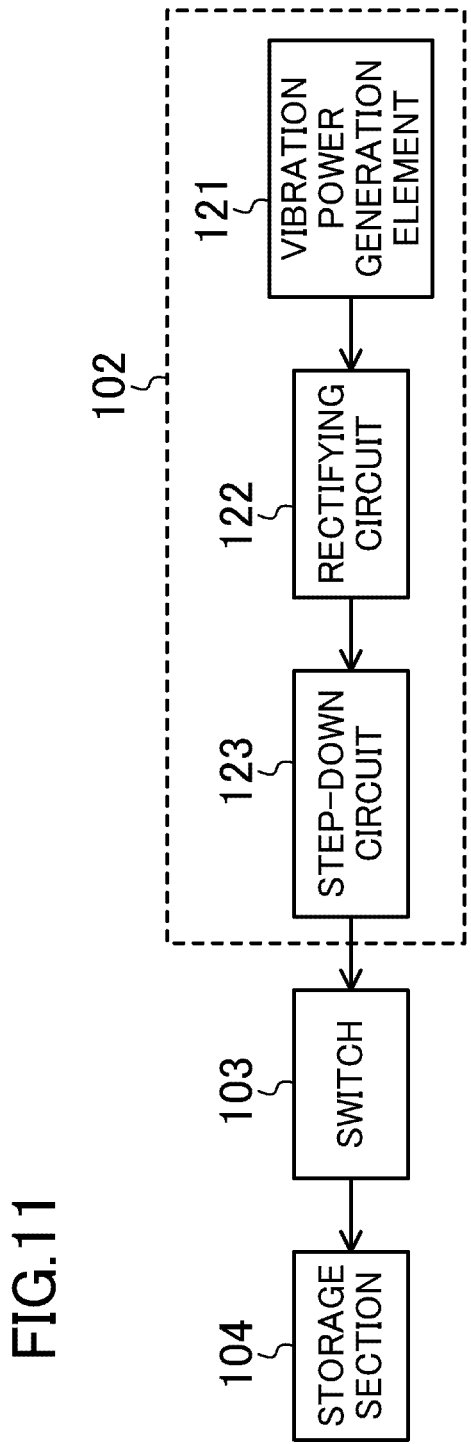
FIG. 11 is a view showing an example configuration of a vibration power generator.

As shown in FIG. 11, the vibration power generator 102 may include a vibration power generation element 121, a rectifying circuit 122, and a step-down circuit 123. The vibration power generation element 121 converts externally applied vibrations to a voltage. The rectifying circuit 122 converts the voltage from the vibration power generation element 121 to a DC voltage. The step-down circuit 123 lowers the voltage level of the DC voltage from the rectifying circuit 122, to supply a DC voltage having a voltage level suitable for charging of the storage section 104. With this configuration, the storage section 104 can be charged properly.

Discharge Characteristic of Storage Section

Figure 12:
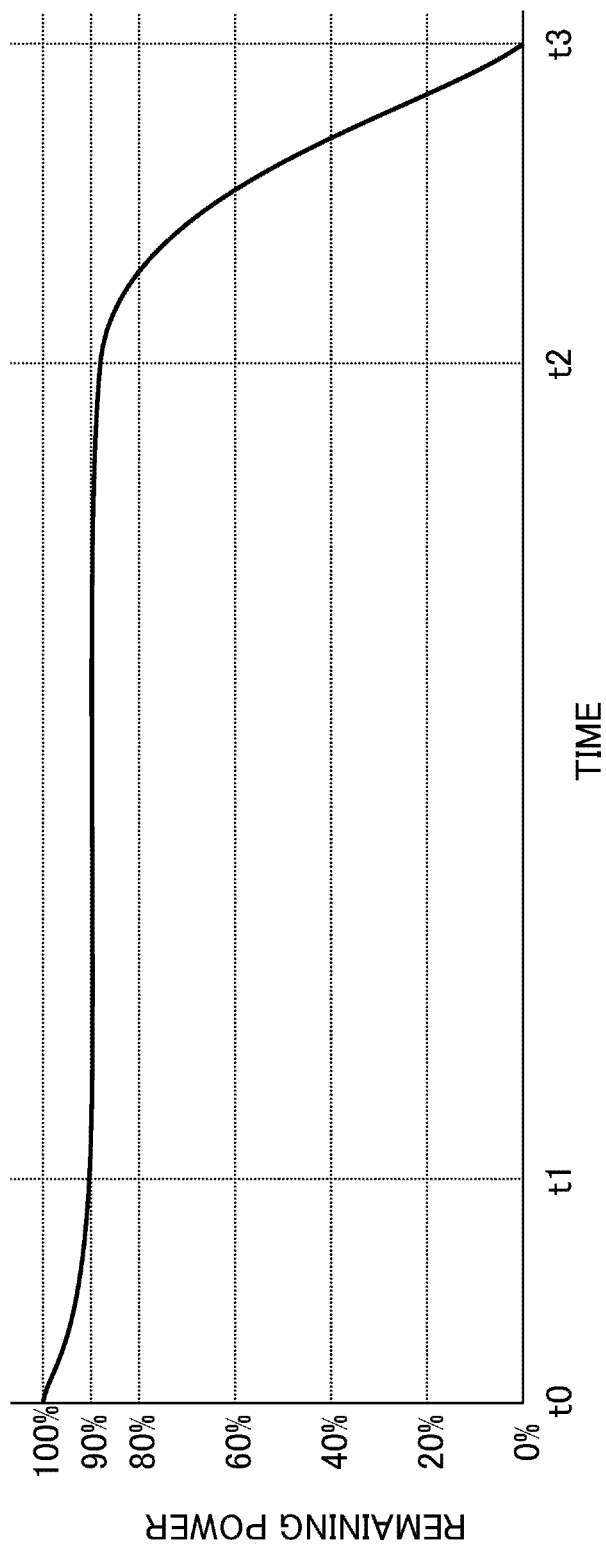
FIG. 12 is a view showing the discharge characteristic of a storage section.

In the above embodiments, the remaining power of the storage section 104 gradually decreases with power consumption by the components of the remote control device. For example, when the storage section 104 is constituted by a secondary battery, the storage section 104 exhibits a discharge characteristic as shown in FIG. 12. In FIG. 12, the y-axis represents the remaining power of the storage section 104 as a percentage with reference to the fully-charged state as 100%, and the x-axis represents the discharge time. During the time period from t0 to t1, the remaining power of the storage section 104 decreases from 100% to about 90%. During the time period from t1 to t2, the remaining power of the storage section 104 scarcely decreases, and during the time period from t2 to t3, the remaining power of the storage section 104 decreases from about 90% to 0%. Having the discharge characteristic of the storage section 104 as shown in FIG. 12, the remaining power of the storage section 104 can be detected more correctly during the time period from t2 to t3 (time period when the remaining power sharply decreases from about 90% to about 0%) than during the time period from t1 to t2 (time period when the remaining power scarcely decreases). Therefore, it is preferable to set the predetermined amount (reference value for power shortage) at an arbitrary value between 90% to 0%.

Example Configuration of Remaining Power Detector

Figure 13:
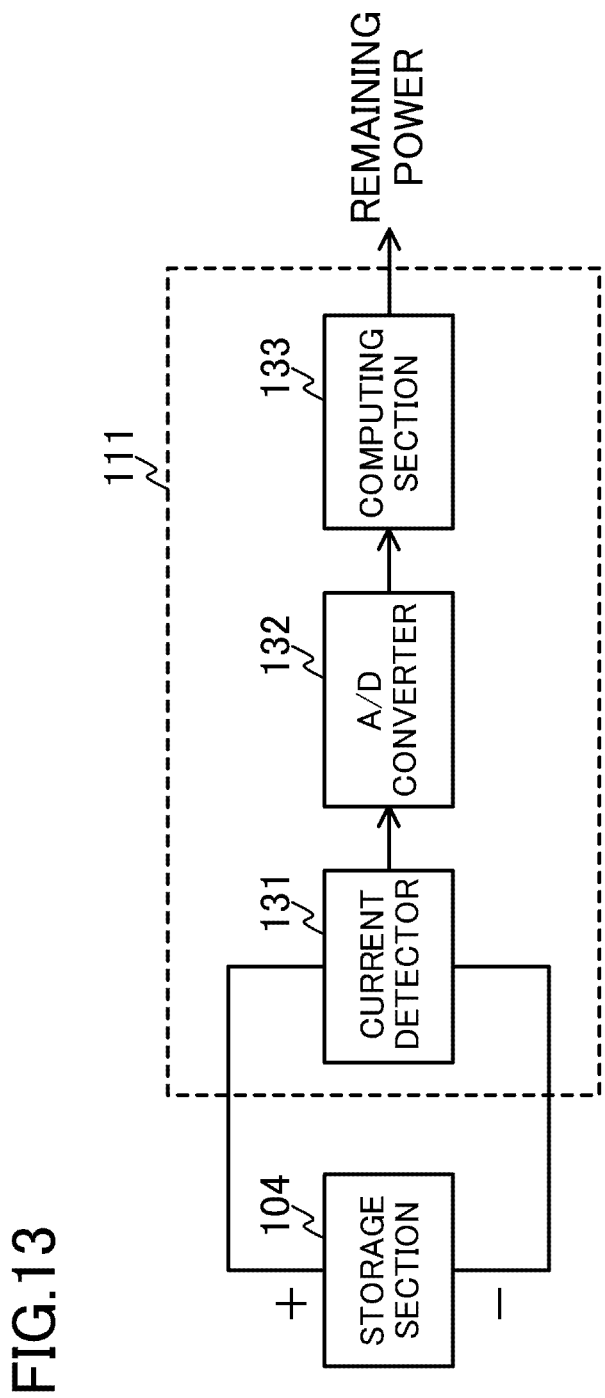
FIG. 13 is a view showing an example configuration of a remaining power detector.

As shown in FIG. 13, the remaining power detector 111 may include a current detector 131, an A/D converter 132, and a computing section 133. The current detector 131 detects the current value (analog value) of the storage section 104. The A/D converter 132 converts the current value from the current detector 131 to a digital value. The computing section 133 detects the remaining power of the storage section 104 based on the digital value from the A/D converter 132. For example, the computing section 133 has a table showing the correspondence between the digital value (current value) and the remaining power, and refers to the table to detect the remaining power corresponding to the digital value. The computing section 133 may otherwise have a table showing the correspondence between the consumed charge amount and the remaining power. In this case, the computing section 133 calculates the consumed charge amount from the digital value (current value) and the discharge time, and refers to the table to detect the remaining power corresponding to the consumed charge amount. Since the consumed charge amount is independent of any change of the discharge characteristic caused by a temperature change, etc., the remaining power of the storage section 104 can be detected correctly by detecting the remaining power based on the consumed charge amount.

As described above, the technique described above permits the user to be notified of power shortage of a remote control device and also instructed to perform an operation for charging the remote control device, and thus is suitable as a remote control device that remotely controls an electronic apparatus (e.g., a TV set, an audio apparatus, a game machine, an air conditioner, a lighting fixture, etc.).

It should be noted that the embodiments described above are essentially preferable illustrations and are by no means intended to limit the present disclosure, applications thereof, or the scope of uses thereof.

What is claimed is:

1. A communication system comprising:
a remote control device; and
an electronic apparatus, wherein
the remote control device includes:
   a vibration power generator configured to convert externally applied vibrations to electric power,
   a storage section charged with the electric power obtained by the vibration power generator,
   a switch provided between the vibration power generator and the storage section, and
   a control circuit configured to output a vibration instruction signal and turn the switch on when the remaining power of the storage section becomes smaller than a predetermined amount, and
the electronic apparatus instructs the user to vibrate the remote control device in response to the vibration instruction signal,
wherein the control circuit outputs a completion notification signal when the remaining power of the storage section becomes larger than the predetermined amount, and
the electronic apparatus notifies the user of completion of charging of the remote control device in response to the completion notification signal.

2. The communication system of claim 1, wherein the electronic apparatus reproduces at least one of an instruction image and an instruction sound for instructing the user to vibrate the remote control device in response to the vibration instruction signal.

3. A communication system comprising:
a remote control device; and
an electronic apparatus, wherein
the remote control device includes:
   a vibration power generator configured to convert externally applied vibrations to electric power,
   a storage section charged with the electric power obtained by the vibration power generator,
   a switch provided between the vibration power generator and the storage section, and
   a control circuit configured to output a vibration instruction signal and turn the switch on when the remaining power of the storage section becomes smaller than a predetermined amount, and
the electronic apparatus instructs the user to vibrate the remote control device in response to the vibration instruction signal,
wherein the electronic apparatus is switchable between an image instruction mode and a sound instruction mode, and reproduces an instruction image for instructing the user to vibrate the remote control device in response to the vibration instruction signal in the image instruction mode, and an instruction sound for instructing the user to vibrate the remote control device in response to the vibration instruction signal in the sound instruction mode.

4. A communication system comprising:
a remote control device; and
an electronic apparatus, wherein
the remote control device includes:
   a vibration power generator configured to convert externally applied vibrations to electric power, a storage section charged with the electric power obtained by the vibration power generator, a switch provided between the vibration power generator and the storage section, and a control circuit configured to output a vibration instruction signal and turn the switch on when the remaining power of the storage section becomes smaller than a predetermined amount, and the electronic apparatus instructs the user to vibrate the remote control device in response to the vibration instruction signal, wherein the electronic apparatus can reproduce an instruction image and an instruction sound for instructing the user to vibrate the remote control device in response to the vibration instruction signal, and the control circuit is switchable between an image instruction control mode and a sound instruction control mode, and outputs an image control signal for directing the electronic apparatus to reproduce the instruction image as the vibration instruction signal in the image instruction control mode, and a sound control signal for directing the electronic apparatus to reproduce the instruction sound as the vibration instruction signal in the sound instruction control mode.

5. The communication system of claim 1, wherein the remote control device remotely controls the electronic apparatus in response to a user operation.

6. The communication system of claim 1, wherein the electronic apparatus is a first electronic apparatus, and the remote control device remotely controls a second electronic apparatus different from the first electronic apparatus that instructs the user to vibrate the remote control device, in response to a user operation.

7. The communication system of claim 1, wherein the remote control device remotely controls the electronic apparatus in response to at least either a user operation or the externally applied vibrations, and the electronic apparatus selectively presents a plurality of games including a vibration game that proceeds by vibrating the remote control device, and changes a currently presenting game to the vibration game in response to the vibration instruction signal.

8. The communication system of claim 1, wherein the control circuit turns the switch off when the remaining power of the storage section becomes larger than the predetermined amount.

9. The communication system of claim 1, wherein the remote control device further includes an external power input section for supplying external power to the storage section.

10. A remote control device configured to output a vibration instruction signal to an electronic apparatus that can instruct the user to vibrate the remote control device in response to the vibration instruction signal, the remote control device comprising:

a vibration power generator configured to convert externally applied vibrations to electric power;

a storage section charged with the electric power obtained by the vibration power generator;

a switch provided between the vibration power generator and the storage section; and a control circuit configured to output the vibration instruction signal and turn the switch on when the remaining power of the storage section becomes smaller than a predetermined amount, wherein the electronic apparatus can notify the user of completion of charging of the remote control device in response to a completion notification signal, and the control circuit outputs the completion notification signal when the remaining power of the storage section becomes larger than the predetermined amount.

11. The remote control device of claim 10, wherein the electronic apparatus can reproduce at least one of an instruction image and an instruction sound for instructing the user to vibrate the remote control device in response to the vibration instruction signal.

12. The remote control device of claim 10, wherein the remote control device remotely controls the electronic apparatus in response to a user operation.

13. The remote control device of claim 10, wherein the electronic apparatus is a first electronic apparatus, and the remote control device remotely controls a second electronic apparatus different from the first electronic apparatus that instructs the user to vibrate the remote control device, in response to a user operation.

14. The remote control device of claim 10, wherein the remote control device remotely controls the electronic apparatus in response to at least either a user operation or the externally applied vibrations, and the electronic apparatus can selectively present a plurality of games including a vibration game that proceeds by vibrating the remote control device, and change a currently presenting game to the vibration game in response to the vibration instruction signal.

15. A remote control device comprising:

a vibration power generator configured to convert externally applied vibrations to electric power;

a storage section charged with the electric power obtained by the vibration power generator;

a switch provided between the vibration power generator and the storage section;

a control circuit configured to output a vibration instruction signal and turn the switch on when the remaining power of the storage section becomes smaller than a predetermined amount; and an electronic circuit configured to instruct the user to vibrate the remote control device in response to the vibration instruction signal, wherein the control circuit outputs a completion notification signal when the remaining power of the storage section becomes larger than the predetermined amount, and the electronic circuit notifies the user of completion of charging of the remote control device in response to the completion notification signal.

16. The remote control device of claim 10, wherein the control circuit turns the switch off when the remaining power of the storage section becomes larger than the predetermined amount.

* * * * *